May 20, 1969     D. M. POPOV     3,445,343
APPARATUS FOR EVAPORATING-CONDENSING SEPARATION OF MIXTURES
Filed Feb. 1, 1967     Sheet 1 of 3

United States Patent Office 3,445,343
Patented May 20, 1969

3,445,343
APPARATUS FOR EVAPORATING-CONDENSING
SEPARATION OF MIXTURES
Dmitry Mikhailovich Popov, Novopeschanaya
ulitsa 26/11, kv. 40, Moscow, U.S.S.R.
Filed Feb. 1, 1967, Ser. No. 613,174
Int. Cl. B01d 3/10, 3/14
U.S. Cl. 202—158                                  8 Claims

ABSTRACT OF THE DISCLOSURE

Apparatus for the evaporating-condensing separation of mixtures, comprising a plurality of sections arranged one above another and interconnected for the passage of vapor from the evaporating zone of the underlying section into the condensing zone of the overlying section. The condensing zone and evaporating zone in each section are separated from each other by a hydraulic seal for supplying condensate from the condensing zone into the evaporating zone of the same section. The sections are separated from each other by a plate accommodating a hydraulic seal for causing overflow of non-evaporated liquid into the underlying section.

---

The present invention relates to apparatus for the separation of liquid mixtures, and more specifically it relates to apparatus for the evaporating-condensing separation of thermally unstable organic mixtures in a vacuum.

The known apparatus for the evaporating-condensing separation of mixtures comprises a number of sections installed one above another, each having a condensing zone and an evaporating zone. Said sections are interconnected to allow passage of vapor from the evaporating zone of an underlying section into the condensing zone of the overlying section.

A hydraulic seal is used for discharging non-evaporated liquid into the underlying section (see, for example, "Processes and Apparatuses in Chemical Industry," No. 30, 1963, Viniti, Moscow, p. 27).

The known apparatus is used for the separation of mixtures under laboratory conditions. The use of such an apparatus is not practicable for industrial purposes since said apparatus possesses small heat exchange surfaces in the evaporating and condensing zones. An increase of the heat exchange surfaces becomes possible only by increasing the diameter which involves enlargement of the size of the apparatus. A considerable distance between the evaporating and condensing zones brings about losses of heat, reduces the output and increases metal consumption for making the apparatus.

An object of this invention is to provide an apparatus for the evaporating-condensing separation of mixtures which has small dimensions and, when used industrially offers practically no hydraulic resistance while at the same time featuring a high efficiency in separating mixtures and a high output.

In compliance with this and other objects of the present invention, in the apparatus for the evaporating-condensing separation of mixtures comprised of a number of sections arranged one above another, each having a condensing zone and an evaporating zone, said sections being interconnected for the passage of vapor from the evaporating zone of an underlying section into the condensing zone of the overlying section and provided with hydraulic seals for discharging non-evaporated liquid into the underlying section according to the invention, the sections are separated from one another by a plate mounting a hydraulic seal for discharging the non-evaporated liquid from the section. The condensing and evaporating zones are separated according to the invention by a hydraulic seal, the heat exchange surfaces in said zones being made in the form of coils.

It is practicable to make the coil in the condensing zone in the form of a cylindrical spiral whereas the coil in the evaporating zone is in the form of a flat spiral.

The coils may be mounted on the plate with the hydraulic seal, separating the sections, the plate rims and the section body forming a circular clearance for the passage of vapor from the evaporating zone of the underlying section. The hydraulic seal separating the condensing and evaporating zones will be constituted by the plate rim and the cylindrical partition with holes for the passage into the evaporating zone of condensate and non-condensing admixtures; the upper part of the partition is connected to the section body and forms a passage for the vapor flowing from the circular clearance into the condensing zone.

To decrease mixing of the liquid during its evaporation, the plate may be provided with a spiral channel for installing a flat coil.

In addition to the plate with the hydraulic seal, separating the section it is preferred to equip each section, with additional plates mounted one above another and having pipes for the passage of the vapors and liquid, said additional plates mounting flat coils forming an evaporating zone, and to install a cylindrical coil on the periphery of the upper plate for forming a condensing zone communicating with the evaporating zone of the underlying section. In this case the hydraulic seal separating the condensing zone from the evaporating zone will be constituted by the plate rim and the lower part of the overlying section body which has holes for the passage of condensate and non-condensing admixtures into the evaporating zone.

Besides the plate with the hydraulic seal separating the sections the evaporating zone of each section may be fitted with additional plates installed one above another and with rims mounting flat coils, the rims of said plates forming circular clearances alternately with the section body and the pipe installed along the longitudinal axis of the section, through which pipe the vapors flow from the evaporating zone of the underlying section into the condensing zone. It is practicable to install the cylindrical coil of the condensing zone under a cap mounted on the plate and closing the pipe from above with a gap for the passage of vapor. The coil will be separated from the evaporating zone by a hydraulic seal formed by the plate rim and the cylindrical wall of the cap, having holes for the passage of condensate and non-condensing admixtures into the evaporating zone.

Other objects and advantages of the present invention will become apparent below from the description of an example of an embodiment with reference to the appended drawings, in which.

The apparatus for the evaporating-condensing separation of mixtures comprises a number of sections installed one above another.

Figure 1:
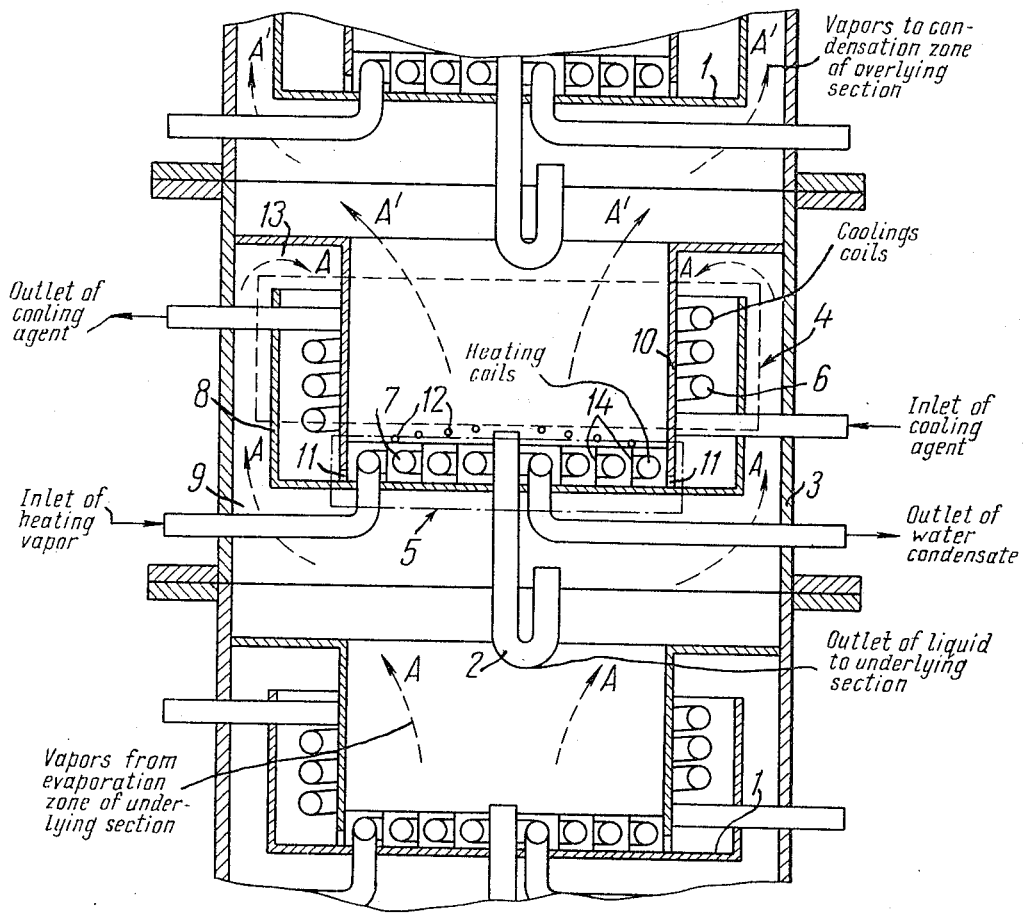
FIG. 1 is a diagrammatic view of an apparatus with sections arranged one above another according to the invention.

The sections are separated from one another by a plate 1 (FIG. 1) with a hydraulic seal 2 for discharging the liquid that failed to evaporate in this particular section. A body 3 of each section incorporates a condensing zone 4 and an evaporating zone 5 in which the heat exchange surfaces take the form of coils 6 and 7, the coil 6 being accommodated in the condensing zone 4 and being made in the shape of a cylindrical spiral. The coil 7 is accommodated in the evaporating zone 5 and is made in the shape of a flat spiral.

The plate 1 is provided with a rim 8 which, together with the section body 3, forms a circular clearance 9 for the passage of vapor along the arrow A from the evaporating zone of the underlying section into the condensing zone 4 of the overlying section.

The cylindrical coil 6 and flat coil 7 are separated from each other by a cylindrical partition 10 which has holes 11 for the passage of condensate into the evaporating zone 5 and holes 12 for the passage of the non-condensing admixtures.

The sets of holes 11 and 12 are located at different heights.

The upper portion of the partition 10 is connected to the section body 3 and, together with the rim 8 of the plate 1, forms a channel 13 for the passage of vapor along the arrow A from the clearance 9 into the condensing zone 4; the lower portion of said partition is connected to the plate 1.

When there is condensate between the rims 8 of the plate 1 and the cylindrical partition 10 they form a hydraulic seal which separates the condensing zone 4 from the evaporating zone 5.

The plate 1 is provided with a spiral channel 14 accommodating the flat coil 7 intended to prevent mixing of the liquid during evaporation and to direct the liquid towards the center of the plate.

The mixtures are separated in the apparatus in the following way.

The vapors of the distillate flow from the evaporating zone of the underlying section through the circular gap 9 and the channel 13 along the arrow A into the condensing zone 4 where they become fully condensed on the surface of the cylindrical coil 6.

The condensate thus produced enters the spiral channel 14 of the condensing zone 5 through the hole 11 in the partition 10 and herein evaporates partly on the surface of the spiral coil 7.

The vapors formed from the condensate, rise along the arrow $A^1$ into the condensing zone of the overlying section while the non-evaporated portion of the liquid flows through the hydraulic seal 2 onto the plate of the underlying section.

Figure 2:
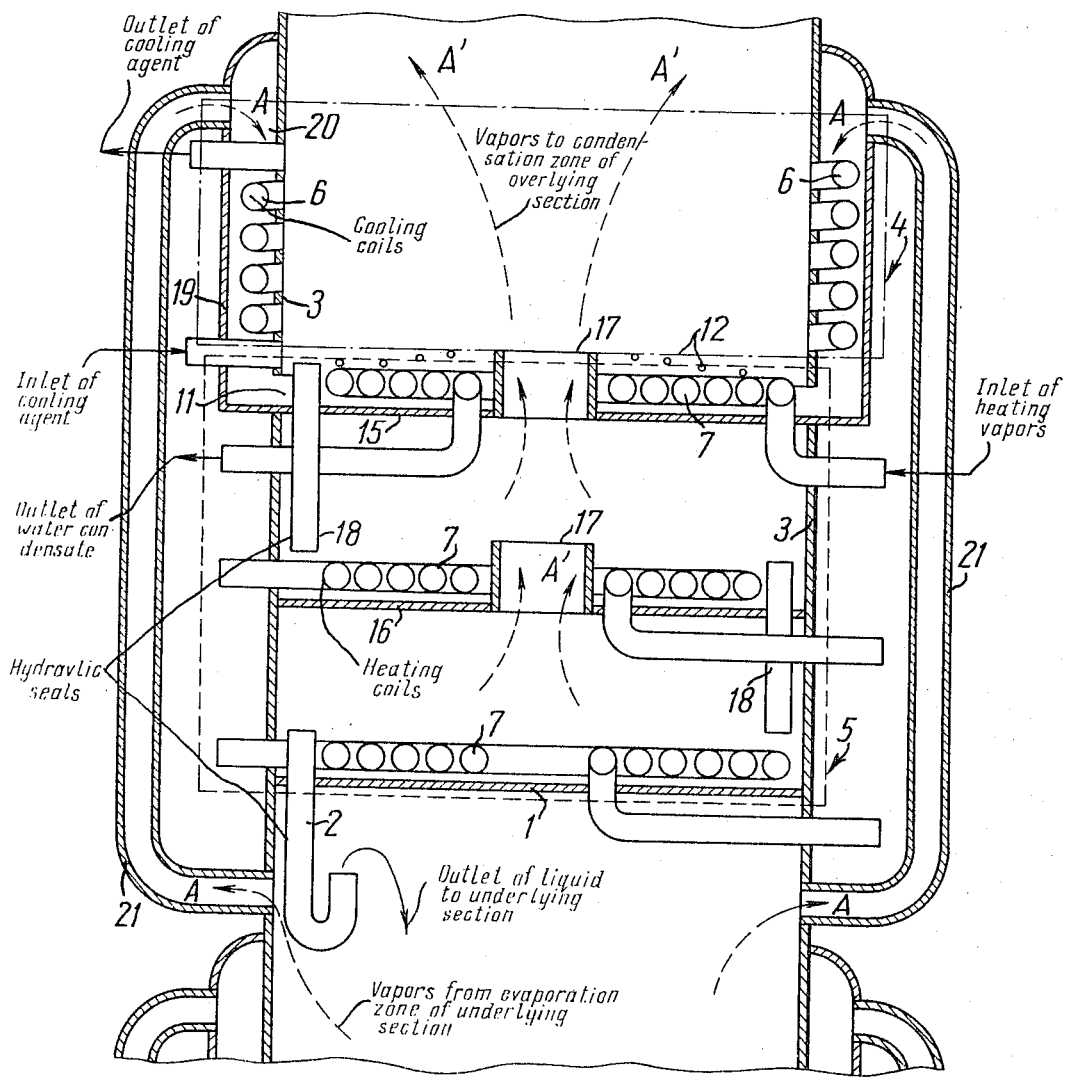
FIG. 2 shows another embodiment of the apparatus, according to the invention.

To increase the output, in the second embodiment of the invention the evaporating zone 5 of each section includes, besides the plate 1 with the hydraulic seal 2 separating the sections, additional plates 15 and 16 (FIG. 2) with pipe connections 17 for the passage of the vapor, and pipe connections 18 for overflow of the non-evaporated liquid. Mounted on the plates 1, 16 and 15 are the flat spiral coils 7.

The upper plate 15 has a rim 19 brought outside the section and, together with the lower portion of the body 3 of the overlying section, forms a channel 20 accommodating the spiral cylindrical coil 6 of the condensing zone 4.

The channel 20 is connected by peripheral pipes 21 to the evaporating zone of the underlying section.

The holes 11 for the passage of condensate and the holes 12 for the passage of the non-condensing admixtures are located in the lower portion of the body 3 of the overlying section.

When there is condensate between the rims 19 and the lower portion of the body 3 of the overlying section, they form a hydraulic seal separating the condensing zone 4 from the evaporating zone 5.

In such a design of the section the vapors of distillate flow from the underlying section through the peripheral pipes 21 in the direction of arrow A into the channel 20 of the condensing zone 4 where they become fully condensed on the surface of the cylindrical coil 6.

The condensate thus obtained flows through the hole 11 into the evaporating zone 5 of the upper plate 15 and further, through the pipe connections 18, onto the underlying plates 16 and 1. Such a directional flow of the liquid along the plates decreases the mixing effect and, consequently, increases the efficiency of separation.

The vapor obtained on the plates 1, 16 and 15 from the condensate rise through the pipe connections 17 in the direction of the arrow $A^1$ into the condensing zone of the overlying section. The non-evaporated liquid flows down into the underlying section through the hydraulic seal 2.

Figure 3:
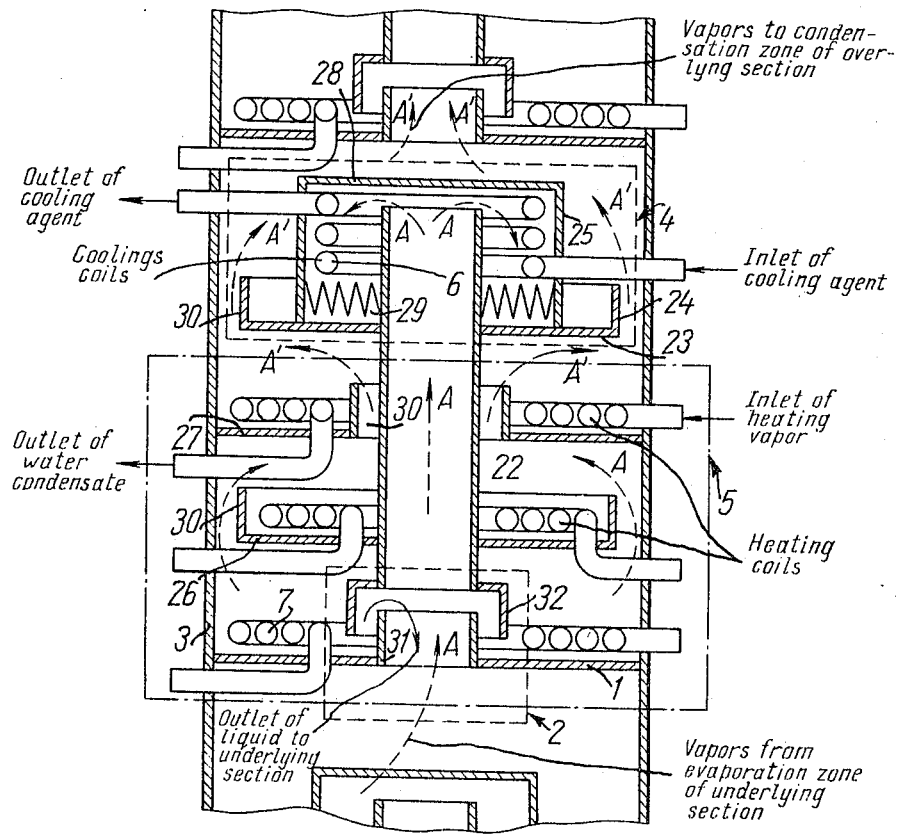
FIG. 3 shows still another embodiment according to the invention.

To reduce heat losses as well as the diameter of the apparatus, the third embodiment of the invention accommodates a pipe 22 (FIG. 3) arranged on the longitudinal axis of each section, for the passage of vapor along the arrow A from the underlying section into the condensing zone 4 whose cylindrical coil 6 is located on a plate 23 with rims 24 under a cap 25. The pipe 22 runs through the evaporating zone 5 which accommodates the plate 1 with the hydraulic seal 2 and additional plates 26, 27 mounting the flat coils 7 and ends in the condensing zone 4, the cap 25 closing the pipe 22 on top, forming a clearance 28 for the passage of vapor along the arrow A from the pipe 22 into the condensing zone 4.

The cylindrical wall of the cap 25 is provided with holes made in the form of slots 29 for the passage of condensate and non-condensing admixtures into the evaporating zone 5.

When there is condensate between the rims 24 of the plate 23 and the cylindrical wall of the cap 25, they form a hydraulic seal separating the evaporating zone 5 from the condensing zone 4.

The rims of the plates 23, 26, 27 form circular clearances 30 alternately with the section body 3 and the pipe 22 for the passage of condensate from the overlying plates onto the underlying ones and for the passage along the arrow $A^1$ of vapor produced from the condensate into the condensing zone of the overlying section.

The non-evaporated liquid flows from the plate 1 down onto the plates of the underlying section through the hydraulic seal 2 formed by the cylindrical wall of a pipe 31 of the plate 1 and by the wider lower portion 32 of the pipe 22.

The industrial use of the apparatus disclosed hereinbefore provides a solution for one of the most important conflicts in vacuum rectification, namely, the relationship between the efficiency of the apparatus and the hydraulic resistance in accordance with its height, and allows for the separation of the mixtures of thermally unstable materials in the chemical, food, vitamin, pharmaceutical and other branches of industry. As the apparatus of the invention is free from interaction of two phases, the resistance of the entire apparatus is determined by the resistance of a single section which is actually nonexistent so that the efficiency of the apparatus may be increased without limit by increasing the number of sections.

Besides, the increase of the heat exchange surfaces and their relative arrangement considerably increases the output of the apparatus and diminishes its size.

In describing the present embodiments of the invention the terms in their narrow sense are used for the sake of lucidity. However, the invention is not confined to the narrow sense of the terms used and it will be understood that each of said terms embraces all the equivalent elements functioning similarly and employed for the same purposes.

While specific embodiments of the invention have been described, it will be understood that various modifications and changes thereto may be made within the spirit and scope of the invention by those skilled in the art.

These modifications and changes can be resorted to without departing from the spirit and scope of the invention as hereinafter defined by the appended claims.

I claim:

1. An apparatus for the evaporative-condensing separation of mixtures, comprising: a plurality of sections arranged one above another and interconnected for the passage of vapor from an underlying section to an overlying one, and for the passage of liquid from the overlying section to the underlying section; plates separating said sections from one another; a hydraulic seal located on each said plate for discharging nonevaporated liquid in the overlying section into the underlying section and preventing direct vapor flow from the underlying to the overlying section; a condensing zone located in each of said sections for the complete indirect condensation of vapors supplied from the underlying section into the overlying section; an evaporating zone located in each of said sections adjacent the corresponding condensing zone for the partial evaporation of condensate supplied from the condensing zone of the same section; a cooling coil located in said condensing zone and a heating coil located in the evaporating zone; and a hydraulic seal for the separation of said condensing zone from said evaporating zone, the latter said seal being located in each of said sections for allowing the condensate to overflow from the condensing zone into the evaporating zone of the same section.

2. An apparatus as claimed in claim 1 wherein the coil in the condensing zone is made in the form of a cylindrical spiral whereas the coil in the evaporating zone is made in the form of a flat spiral.

3. An apparatus as claimed in claim 2 wherein in addition to the plate with a hydraulic seal separating the sections, each section is provided, with additional plates, arranged one above another and having pipes for the passage of vapor and liquid, said additional plates mounting flat coils forming the evaporating zone while a cylindrical coil is located on the periphery of the upper plate, forming the condensing zone communicating with the evaporating zone of the underlying section, the hydraulic seal which separates the condensing and evaporating zones being formed by the rim of the plate and the lower portion of the body of the overlying section having holes for the passage of condensate and noncondensing admixtures into the evaporating zone.

4. An apparatus as claimed in claim 2 wherein each section in the evaporating zone, in addition to the plate with a hydraulic seal, separating the sections, is provided with additional plates installed one above another, said additional plates having rims on which flat coils are located, the plate rims forming circular clearances alternately with the section body and the pipe installed on the longitudinal axis of the section and conducting the vapor from the evaporating zone of the underlying section into the condensing zone, whose cylindrical coil is located under the cap, installed on the plate and closing the pipe from the top with a clearance for the passage of vapor, said coil being separated from the evaporating zone by a hydraulic seal formed by the plate rim and the cylindrical wall of the cap, said coil having holes for the passage of condensate and noncondensing admixtures into the evaporating zone.

5. An apparatus as claimed in claim 1 wherein the coils are mounted on a respective plate with a hydraulic seal, separating the sections, the rims of said plate together with the section body, forming a circular clearance for the passage of the vapor from the evaporating zone of the underlying section, while a hydraulic seal separating the condensing zone from the evaporating zone is formed by the plate rim and a cylindrical partition with holes for the passage of condensate and noncondensing admixtures into the evaporating zone, the upper portion of the partition being connected to the section body and forming a channel for the passage of vapor from the circular clearance into the condensing zone.

6. An apparatus as claimed in claim 5 wherein each plate is provided with a spiral channel accommodating a flat coil, to reduce mixing of the liquid.

7. An apparatus as claimed in claim 1 wherein the coils are located on a respective plate with the hydraulic seal separating the sections, the rims of said plate together with the section body forming a circular clearance for the passage of vapor from the evaporating zone of the underlying section, while the hydraulic seal separating the condensing zone from the evaporating zone is formed by the plate rim and the cylindrical partition with holes for the passage of condensate and noncondensing admixtures into the evaporating zone, the upper portion of the partition being connected with the section body and forming a channel for the passage of vapor from the circular clearance into the condensing zone.

8. An apparatus as claimed in claim 7 wherein the plate is provided with a spiral channel accommodating a flat coil, to reduce mixing of the liquid in the course of evaporation.

References Cited

UNITED STATES PATENTS

| 1,418,885 | 6/1922 | Schulze | 261—148 X |
| 1,519,719 | 12/1924 | Brandon | 261—148 X |
| 1,567,458 | 12/1925 | Newton | 196—128 |
| 1,981,346 | 11/1934 | De Florez | 26—114 |
| 2,578,670 | 12/1951 | Carleton | 260—406 |

NORMAN YUDKOFF, *Primary Examiner.*

J. SOFER, *Assistant Examiner.*

U.S. Cl. X.R.
202—173; 261—148